United States Patent [19]

Bonnell

[11] Patent Number: 4,497,838

[45] Date of Patent: Feb. 5, 1985

[54] PROCESS FOR THE PRODUCTION OF USEFUL PRODUCTS FROM ORANGE PEEL

[75] Inventor: James M. Bonnell, Bradenton, Fla.

[73] Assignee: Tropicana Products, Inc., Bradenton, Fla.

[21] Appl. No.: 486,829

[22] Filed: Apr. 20, 1983

Related U.S. Application Data

[63] Continuation of Ser. No. 349,605, Feb. 17, 1982, abandoned, which is a continuation-in-part of Ser. No. 99,007, Nov. 30, 1979, abandoned.

[51] Int. Cl.³ .......................... A23L 1/28; C11B 9/02
[52] U.S. Cl. .................................. 426/429; 426/616; 426/481
[58] Field of Search ............... 426/616, 429, 417, 615, 426/651, 481; 260/236.6, 412.8; 127/43, 44

[56] References Cited

U.S. PATENT DOCUMENTS

| | | | |
|---|---|---|---|
| 2,158,670 | 5/1939 | Barnes et al. | 260/236.6 |
| 2,708,627 | 5/1955 | Toulmin | 426/429 |
| 2,776,278 | 1/1957 | Birds | 260/236.6 |

OTHER PUBLICATIONS

Braverman, *Citrus Products*, 1949, pp. 29–33 and 196–207.

Primary Examiner—George Yeung
Attorney, Agent, or Firm—Burns, Doane, Swecker & Mathis

[57] ABSTRACT

An improved process is provided for the recovery of useful products from orange peels derived from the processing of oranges. The peel is contacted with a solution comprising a non-aqueous water-miscible solvent to extract the sugars, essential oils, and bioflavanoids contained therein. The solvent-extracted peel is dried to produce a product high in cellulose and pectin. The extract is diluted with an aqueous solution to render the essential oils insoluble, with the essential oils being recovered from the extract, causing the bioflavanoids to precipitate and permit their recovery by filtration. The remaining portion of the extract may be recovered and purified to provide a sugar syrup.

15 Claims, 1 Drawing Figure

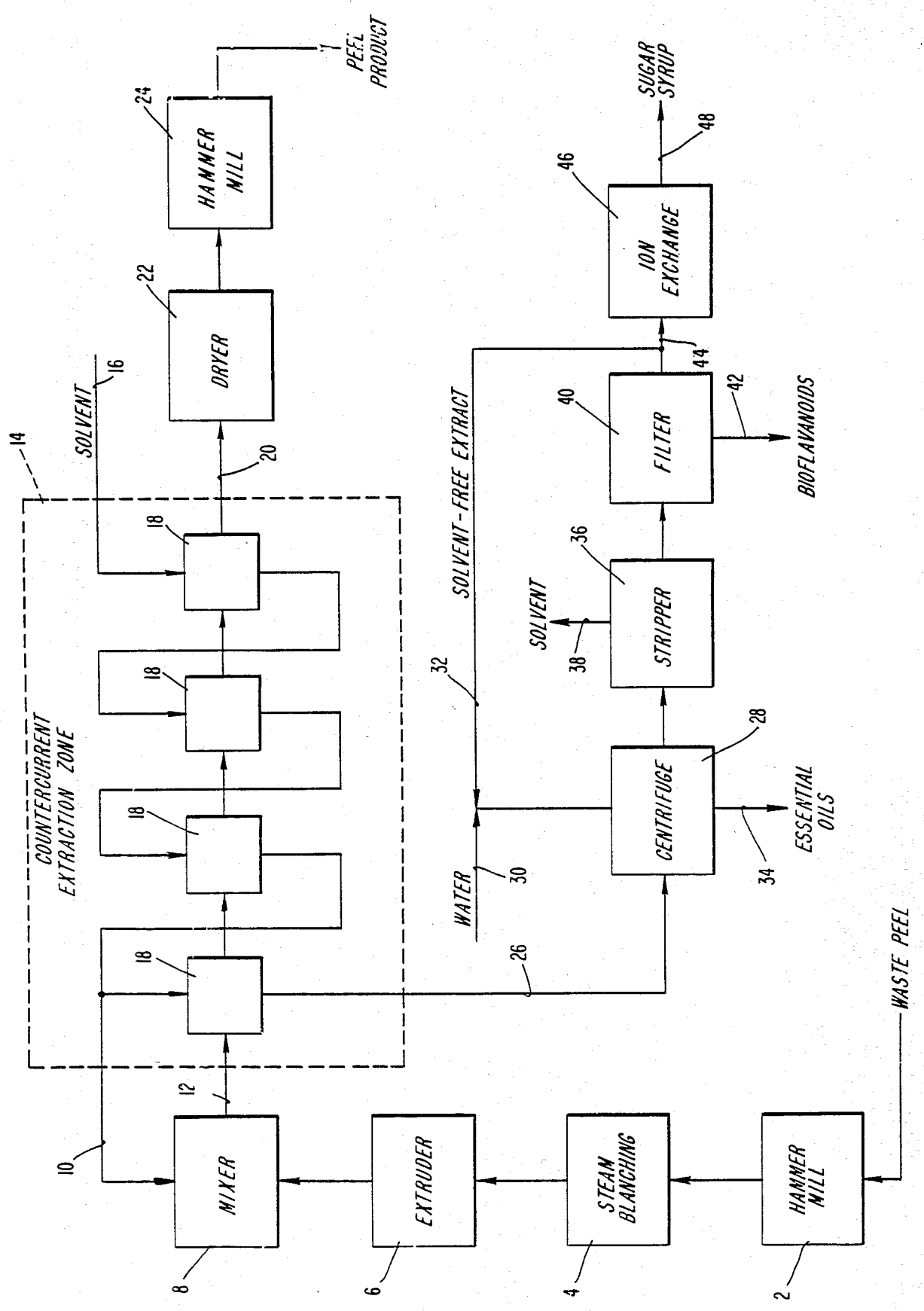

PROCESS FOR THE PRODUCTION OF USEFUL PRODUCTS FROM ORANGE PEEL

REFERENCE TO RELATED APPLICATIONS

This application is a continuation of application Ser. No. 349,605 filed Feb. 17, 1982, abandoned, which is a continuation-in-part of application Ser. No. 099,007, filed Nov. 30, 1979, abandoned.

BACKGROUND OF THE INVENTION

The present invention is directed to the processing of solid orange-derived waste to provide useful products.

One of the major problems encountered over the years with respect to the production of orange juice, orange concentrate and orange sections has been the disposal of the various waste products including the orange peel, seeds, rag and pulp. For many years these materials were believed to be of little practical value and accordingly were simply disposed of as waste without being processed in any way.

In recent years, however, it has been found that certain of these waste materials (e.g., the peel) could be further processed to provide an excellent and highly nutritious cattle feed. Unfortunately, while the use of such processed wastes did help to alleviate a portion of the waste disposal problem, the processing of the wastes to provide cattle feed was not as economically attractive as had been hoped.

Accordingly, efforts have recently been made to process such waste materials to provide products which are suitable for human as well as animal consumption. It is also desirable to provide a diverse range of products from the processing of such materials in order to take full advantage of the raw materials contained therein.

Unfortunately, the waste materials are not easily processed in an attempt to meet these ends. For example, U.S. Pat. No. 2,215,944 discloses a process where the orange peel is treated with lime to provide a product suitable for use as cattle feed. However, the use of lime is not advantageous as it generally yields a bitter tasting product. In addition, the pectin which is present in the peel is destroyed or damaged during processing with lime, thus removing one of the desirable components in the peel from the standpoint of human and animal consumption. However, the peel is difficult to process without the use of lime or related materials (e.g., magnesium or aluminum-containing compounds) since it is very slimey. The processed peel is also difficult to dry due to the cellular structure of the peel which is usually rendered less intact through contact with materials such as lime.

In addition, the peel contains a substantial amount of various sugars which are desirably removed from the peel in order to reduce the caloric content of the finished product. The sugars are very hygroscopic and, if present in significant amounts, also render the processed peel very difficult to dry. The peel also contains significant amounts of essential oils (i.e., naturally occurring volatile oils) which are the odor and/or flavor component of the peel. The essential oils can provide bitter or unpleasant taste sensations and are thus desirably removed from the peel.

As an alternative to lime processing, waste peels have been washed with water to remove portions of the sugars and bad flavors present. Such aqueous washing does not, however, remove much of the essential oils which are present. Carotenoid pigments also remain in the product, and after a short period of time, oxidize to produce an unpleasant "haylike" flavor. The water-washed products are also difficult to press in order to remove excess water. The finished product thus generally contains an unreasonably high water content (e.g., 85 percent by weight or greater), rendering the product expensive to dry. An additional waste material in the form of the wash water is also created which is difficult to treat due to the presence of the sugars and other peel-derived components which have been extracted from the peel.

It is therefore desirable to provide an improved process for the treatment of the waste materials derived from the processing of oranges in order to produce a variety of useful products which are suitable for human and animal consumption. It is also desirable to provide a process which is more attractive economically as well as more efficient than the processes conventionally employed in the orange processing industry.

OBJECTS AND SUMMARY OF THE INVENTION

It is therefore an object of the present invention to provide a process for the treatment of solid orange-derived waste products which avoids the use of lime.

It is further an object of the present invention to provide a process for the recovery of a wide variety of products suitable for human and animal consumption from orange-derived waste.

It is yet further an object of the present invention to provide an efficient and economically attractive process for the treatment of orange-derived waste.

It is still further an object of the present invention to overcome the disadvantages of the prior art as described above.

It is still yet another object of the present invention to provide useful products from orange-derived waste.

In one aspect of the present invention there is provided a process for the recovery of useful products from orange peels comprising:

subjecting the orange peel to countercurrent solvent extraction in a solvent extraction zone with a solution comprising a non-aqueous water-miscible solvent selected from the group consisting of lower alcohols, lower ketones, and mono and dialkyl ethers of ethylene glycol, said solution as it is fed to said solvent extraction zone comprising said water-miscible solvent in substantially undiluted form, said orange peel being contacted with said solution for a period of time sufficient to provide an aqueous extract containing substantially all of the sugars, essential oils and bioflavanoids from the peel which are present therein;

drying the solvent-extracted peel to produce a solid product which is high in cellulose and pectin;

diluting the extract from the solvent extraction step with sufficient aqueous diluent to render insoluble the essential oils contained in the extract;

separating the essential oils from the extract;

removing the non-aqueous solvent from the extract to render insoluble the bioflavanoids present in the extract;

separating the insoluble bioflavanoids from the extract; and purifying the resulting extract to produce a sugar syrup product.

In yet another aspect of the present invention there are provided peel-derived products produced by above-described process.

In yet another aspect of the present invention there is provided a process for the recovery of useful products from orange peels comprising:

subjecting the orange peel to countercurrent solvent extraction in a solvent extraction zone with a solution comprising a non-aqueous water-miscible solvent selected from the group consisting of lower alcohols, lower ketones, and mono and dialkyl ethers of ethylene glycol, said solution as it is fed to said solvent extraction zone comprising said water-miscible solvent in substantially undiluted form, said orange peel being contacted with said solution for a period of time sufficient to provide an aqueous extract containing substantially all of the sugars, essential oils and bioflavanoids from the peel which are present therein;

diluting the extract from the solvent extraction step with sufficient aqueous diluent to render insoluble the essential oils contained in the extract; and separating the essential oils from the extract.

BRIEF DESCRIPTION OF THE DRAWING

The FIGURE schematically depicts the process of the present invention wherein orange fruit-derived waste is treated to provide a variety of products.

DETAILED DESCRIPTION OF THE INVENTION

The process of the present invention will be described in conjunction with the FIGURE. In accordance with the process of the present invention, waste orange peel is provided which consists of waste from a conventional process such as the processing of oranges to provide orange juice. The peel is fed to and coarsely ground in a suitable mill 2 such as a hammer mill. The peel is ground to an extent such that the peel is substantially broken up.

The ground orange peel is then preferably passed to a steam blanching zone 4 wherein it is contacted with steam for several minutes, followed by extrusion in a screw finisher 6. The peel is contacted with steam in the steam blanching zone for about 5–15 minutes to soften the peel and render it more amenable to extrusion in the screw finisher. The screw finisher serves to remove any seeds, stems or leaves which may have been included with the peel waste, as well as rendering the peel more finely divided. Naturally, the more finely divided the peel is, the more effective will be the solvent extraction process.

The combination of the steam blanching and extrusion steps is not solely applicable, however, to processes wherein orange peels are processed. Advantageously, these steps also enhance the extractive processing of various types of citrus fruit-derived peels (e.g. grapefruit peel, lemon peel, lime peel, etc.) by rendering the peels more amenable to extraction with various types of aqueous or non-aqueous liquids (e.g. water, lower alcohols, lower ketones, etc.).

The peel is then passed to mixing zone 8 wherein it is admixed with a suitable liquid such as the non-aqueous solvent hereinafter described or a portion of the extract 10 from the solvent extraction step to form a slurry. The slurried peel extrudate 12 is then subjected to solvent extraction in the extraction zone 14, wherein the peel extrudate is contacted with sufficient quantities of a non-aqueous solvent 16 to provide the desired degree of extraction.

In order to be suitable for use in the process of the present invention, the non-aqueous solvent must be water-miscible. Sugar must also be soluble in an aqueous solution of the solvent. The solvent preferably has a relatively low boiling point in order to enable the solvent to be easily recovered from an aqueous solution. To further ease the recovery of the solvent, the solvent preferably does not form an azeotrope with water. Non-aqueous solvents which are suitable for use in the present invention include lower alcohols such as methyl alcohol, ethyl alcohol, propyl alcohol, or isopropyl alcohol, etc.; lower ketones such as dimethylketone, methylethylketone, etc.; and mono and dialkyl ethers of ethylene glycol or their esters such as acetates. Methyl alcohol is the preferred solvent as it does not form a azeotrope with water while also having a relatively low boiling point. Advantageously, methyl alcohol also dissolves oil-soluble insecticides which may be present on the peel. The above list of suitable solvents is non-inclusive, and one of ordinary skill in the art can readily determine which non-aqueous solvents are suitable for use in the present invention.

The extruded peel may be contacted with the non-aqueous solvent in the extraction zone 14 by any manner and for a sufficient period of time suitable to extract substantially all of desired components from the peel. While countercurrent extraction in multiple stages 18 has been illustrated in the FIGURE, batch solvent extraction operations are also appropriate and do not detract from the benefits achieved by the present invention. Countercurrent extraction is, however, the preferred method of extraction.

It should be noted that the non-aqueous solvent 16 which is fed to the countercurrent extraction zone 14 is preferably substantially undiluted (i.e., substantially non-aqueous or commercial grade in purity). The solvent may be derived from an external source or may consist of a solvent fraction which has been recycled from subsequent processing steps as will be more fully discussed hereinafter. The solvent may be diluted with minor amounts of water (e.g., up to about 15 percent by weight of water based on the weight of the total solution) without adversely affecting the effectiveness of the extraction process.

As the solvent 16 contacts the slurried peel in the last stage of the countercurrent extraction zone, the essential oils and oil-soluble components (e.g., carotene, chlorophyll, flavanones, etc.) which are present in the peel are extracted therefrom. Water is also gradually removed from the peel during the extraction process as the solvent passes from stage to stage in the extraction zone. As the water content of the extraction solution increases, the water-soluble components (e.g., various sugars, citric acid, some salts) present in the peel are also removed. The removal of the strongly flavored essential oils from the peel enables products to be produced from the treated peel which are useful in a variety of applications without being hindered by the presence of a strong orange flavor.

The solvent extracted peel 20 which exits from the extraction zone 14 thus contains little sugar, is low in essential oils (i.e., less than about 0.005 percent by weight based on dry solids), and consists substantially of protopectin (i.e., cellulose and pectin). The concentration of the sugars which were originally present is generally reduced to below about 5 percent by weight based on the weight of the dry solids. The pectin which is present in the peel is substantially unaffected by the extraction process such that the dried processed peel will normally contain at least about 30 percent by weight of pectin. Importantly, the water holding capacity of the peel is not impaired as a result of the extraction process.

The solvent extracted peel 20 is then dried in drying zone 22 by suitable means such as by contact with superheatd solvent vapor to remove any solvent and moisture which may remain. The peel may be additionally dried under a vacuum to ensure substantially complete removal of the solvent and/or moisture. The dried, desolventized peel product is then preferably ground in a milling zone 24 by suitable means such as a hammer mill to a size appropriate for its intended use, examples of which are given below. For example, the processed peel can advantageously be ground sufficiently to pass through an 80 mesh screen using a micropulverizer, with the finely ground peel being bagged for storage or shipment.

The liquid extract 26 which exits from the extraction zone contains several orange peel-derived compounds which may be eventually separated therefrom to provide additional useful products. A major portion of the liquid extract comprises the non-aqueous solvent (e.g., 60 to 65 percent by weight). Other components which are present include the alcohol-soluble components such as essential oil (of which d-limonene predominates), bioflavanoids such as hesperidin, carotenoid pigments, and chlorophyll.

In order to effect separation of the essential oils and other alcohol-soluble components from the extract, the extract is fed into a separation zone 28 wherein it is substantially diluted with externally-supplied water 30 or recycled desolventized extract 32. Upon suitable dilution, the alcohol-soluble essential oils which are present (along with chlorophyll and carotenoid pigments) are rendered insoluble such that an emulsion is formed. The essential oils can be agglomerated and easily removed from the extract by suitable means such as centrifugation as a separate highly colored product 34 which also contains chlorophyll and the carotenoid pigments. The chlorophyll and the carotenoid pigments can be subsequently removed from the oils by distillation if so desired.

Normally, the amount of aqueous diluent which need be added to the extract to effect adequate separation of the soluble oils comprises at least about 15 percent by weight of the extract, and most preferably about 20 percent by weight. Sufficient diluent need only be added, however, to ensure adequate separation of the essential oils without excessively diluting the extract with the aqueous solution. The addition of an excessive amount of diluent, while having no adverse effect upon the separation of the oils from the extract, may place an unnecessary burden upon any separation equipment downstream of the separation zone 28.

The fact that the alcohol-soluble essential oils can be easily rendered insoluble by dilution of the extract with an aqueous diluent is indeed surprising. Normally, the removal of essential oils from such solutions by means such as fractional distillation is extremely difficult due to the azeotropic nature of the solution. However, it has been found that the dilution of the extract with an aqueous diluent causes the essential oils which are in solution to readily separate therefrom, whereupon they can be easily separated by suitable means such as centrifigation.

The solvent which remains in the extract is then removed by suitable means such as steam distillation in stripping zone 36. The solvent 38 which is recovered from the extract may be recycled to the extraction zone 14 for the treatment of additional waste peel.

After the non-aqueous solvent has been removed from the extract, the orange peel-derived bioflavanoids remaining therein are rendered insoluble due to the lessened concentration of solvent in the extract and will precipitate out of solution. The bioflavanoids may thus be easily recovered as a separate product 40 by filtration in filtration zone 42.

A portion of the desolventized and filtered extract 44 may be recycled to the centrifuge zone 28 to serve as the previously-described aqueous diluent 32. The remainder of the extract may, however, be further processed to provide a purified sugar syrup product.

Specifically, the remainder of the extract may be passed through an ion exchange zone 46 to remove any remaining impurities. Advantageously, the extract may be sequentially contacted with a strong acid ion exchange resin, a weak base ion exchange resin, and a weak acid ion exchange resin. The extract may then further purified by being passed through a bed of activated carbon (not depicted). As a result of this purification treatment, an extract 48 in the form of a sugar syrup is produced which basically consists of an aqueous solution of sucrose, dextrose, levulose and a few trace impurities.

The process of the present invention thus produces a variety of products which have multiple uses. The processed peel exhibits substantial water retention and may be used as a thickener, emulsifier, or stabilizer. For example, the peel product in a finely ground state may be used to maintain freshness and moisture in baked goods such as bread, doughnuts, cakes and cookies. The processed peel reduces spoilage by inhibiting mold formation. Generally, amounts in the range of about 1 to 3 percent by weight based on the weight of the baked goods is sufficient to provide the desired results. The sugar syrup product may be employed as a whole natural sweetening agent in an appropriate comestible beverage such as fruit juice, baked goods, etc.

The invention is additionally illustrated in connection with the following Examples which are to be considered as illustrative of the present invention. It should be understood, however, that the invention is not limited to the specific details of the Examples.

EXAMPLE 1

Six hundred forty pounds of orange peel are ground in a hammer mill to a maximum particle size of about 2 cm × 2 cm × 3 mm. The pulverized peel is then charged into a solvent extraction cell wherein it is contacted with an aqueous extractive solution comprising about 95 to 99 percent by weight of methanol. The extractive solution is circulated through the pulverized orange peel for about 15 minutes, after which time the peel has been contacted with about 1250 to 1300 pounds of the methanol-containing solution. At the end of the 15 minute extraction period, the extractive solution comprises about 67 to 72 percent by weight of methanol.

The above is repeated using 1250 to 1300 pounds of fresh methanol yielding an extractive solution of 89 to 92 percent methanol. This is again repeated using 1250 to 1300 pounds of fresh methanol yielding an extractive solution of 96 to 98 percent methanol.

The orange peel is removed from the extraction cell, allowed to drain, and dried in a steam tube drier to produce an orange flour. The orange flour product is light tan in color and consists of about 96 pounds of finely divided orange peel which has a water holding capacity of 10.6 grams of water per gram of flour. A representative analysis of the major components of the orange flour product (basis dry solids) is set forth in Table I below:

TABLE I

| Example 1 Orange Flour Composition (% by wt) | | | |
|---|---|---|---|
| Crude Fiber | 18.20 | Acid Detergent Fiber | 26.6 |
| Protein | 5.92 | Neutral Detergent Fiber | 27.7 |
| Moisture | 5.12 | Pectin | 32.0 |
| Fat (Acid Hydrolysis) | 2.15 | Pentosan | 26.4 |
| Ash | 3.48 | Fructose | 0.87 |
| Sucrose | 1.79 | Glucose | 0.84 |

The 1250 to 1300 pounds of solution used in the extraction of the orange peel (i.e., the liquid extract) are then combined with sufficient desolventized extract to render the mixture cloudy, indicating that the essential oils present have separated from solution and that an emulsion has formed. The mixture is centrifuged and an oily fraction separated from the extract. The oily fraction is distilled under a vacuum of 5 mm Hg absolute to yield a clear, water white, pleasant smelling citrus oil and a solid residue which contains carotenoid pigments and chlorophyll.

The remaining portion of the diluted extract is stripped of the methanol containing therein by steam stripping. Upon cooling, the desolventized extract is filtered to recover crude hesperidin rendered insoluble by the removal of the methanol.

The desolventized extract which remains is sequentially percolated through an ion exchange column which contains the strong acid ion exchange resin IR120 (marketed by Rohm and Haas), an ion exchange column containing the weak base ion exchange resin A-37 (marketed by Diamond Alkali Co.), an ion exchange column containing the weak acid ion exchange resin IR84 (marketed by Rohm and Haas), and a bed of activated charcoal. The resulting liquid product is adjusted to a concentration of 65 brix to yield a sugar syrup.

EXAMPLE 2

A quantity of orange peel is collected in a drum and contacted with steam for about ten minutes until it is rendered soft. The softened peel is then passed through a screw finisher equipped with a 0.040 inch screen. The extruded peel is then pulped to form a puree. An 8.8 pound portion of the puree is subjected to countercurrent extraction with the extracted peel being dried to yield a peel product comprising 1.23 pounds of dry solids. The liquid extract is processed in the same manner as described in Example 1 so as to recover the essential oils and bioflavanoids therefrom as well as provide a sugar syrup product.

EXAMPLE 3

Raw peel prepared according to Example 1 is subjected to countercurrent solvent extraction by being fed to a countercurrent solvent extraction zone at a rate of 10 pounds/minute. Substantially undiluted methanol (at least 95 percent) is fed to the extraction zone at a rate of 15 pounds/minute. Extracted orange peel exits from the extraction zone at a rate of 4.5 pounds/minute (pressed weight) and spent methanol exits from the extraction zone at a rate of 20.5 pounds/minute. The composition of each of the above streams is set forth below:

TABLE II

| Composition of Feed and Product Streams During Countercurrent Extraction | |
|---|---|
| Raw Orange Peel: | 7.5 lbs water |
|  | 1.5 lbs insoluble solids |
|  | 1.0 lbs soluble solids |
|  | 10.0 lbs total |
| Extracted Orange Peel: | 0.2 lbs water |
|  | 1.5 lbs insoluble solids |
|  | trace of soluble solids |
|  | 2.8 lbs methanol |
|  | 4.5 lbs total |
| Spent Alcohol: | 7.3 lbs water |
|  | 1.0 lbs soluble solids |
|  | 12.2 lbs methanol |
|  | 20.5 lbs total |

The extracted orange peel is processed in a manner similar to that described in Example 1 to provide an orange flour having a composition corresponding to that set forth in Table I.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for the recovery of useful products from citrus fruit peels comprising:
   subjecting the citrus fruit peel to countercurrent solvent extraction in a solvent extraction zone with a solution comprising a non-aqueous water-miscible solvent selected from the group consisting of lower alcohols, lower ketones, and mono and dialkyl ethers of ethylene glycol, said solution as it is fed to said solvent extraction zone comprising said water-miscible solvent in substantially undiluted form, said peel being contacted with said solution for a period of time sufficient to provide an aqueous extract containing substantially all of the sugars, essential oils and bioflavanoids from the peel which are present therein;
   removing said solvent-extracted peel from contact with said solution;
   drying the solvent-extracted peel to produce a solid product which is high in cellulose and pectin;
   diluting said extract from the solvent extraction step with sufficient aqueous diluent to render insoluble the essential oils contained in the extract;
   separating the essential oils from the extract;
   removing the non-aqueous solvent from the extract to render insoluble the bioflavanoids present in the extract;
   separating the insoluble bioflavanoids from the extract; and
   purifying the resulting extract to produce a sugar syrup product.

2. The process of claim 1 wherein the peel is ground prior to the solvent extraction step to substantially break up the peel.

3. The process of claim 1 wherein the non-aqueous water-miscible solvent is methyl alcohol.

4. The process of claim 2 wherein the ground peel is contacted with steam prior to the extraction step to soften the ground peel.

5. The process of claim 4 wherein the steam-softened peel is extruded through a screw finisher prior to the extraction step.

6. The process of claim 1 wherein the purification step includes contacting the extract with at least one ion exchange resin.

7. The process of claim 6 wherein the extract is purified by being sequentially contacted with a strong acid ion exchange resin, a weak base ion exchange resin, a weak acid ion exchange resin, and activated carbon.

8. The process of claim 1 wherein the essential oils are removed from the extract by centrifugation.

9. The process of claim 1 wherein the bioflavanoids are removed from the extract by filtration.

10. The process of claim 1 wherein said citrus fruit comprises oranges.

11. A process for the recovery of a useful product from citrus fruit peels comprising:
    subjecting the citrus fruit peel to countercurrent solvent extraction in a solvent extraction zone with a solution comprising a non-aqueous water-miscible solvent selected from the group consisting of lower alcohols, lower ketones, and mono and dialkyl ethers of ethylene glycol, said solution as it is initially fed to said solvent extraction zone comprising said water-miscible solvent in substantially undiluted form such that it contains less than 15 percent by weight of water, said citrus fruit peel being contacted with said solution for a period of time sufficient to provide an aqueous extract containing substantially all of the sugars, essential oils and bioflavanoids from the peel which are present therein;
    removing said solvent-extracted peel from contact with said solution; and
    drying the solvent-extracted peel to produce a solid product which is high in cellulose and pectin.

12. The process of claim 11 wherein the non-aqueous water-miscible solvent is methyl alcohol.

13. The process of claim 11 wherein said citrus fruit comprises oranges.

14. The process of claim 11 wherein said solvent-extracted peel comprises less than 5 weight percent of sugars and at least 30 percent by weight of pectin.

15. The solid-solvent extracted peel product produced by the process of claim 11 containing at least 30 percent by weight of pectin and less than 0.005 percent by weight of essential oils.

* * * * *